United States Patent
Jin et al.

(10) Patent No.: US 10,026,115 B2
(45) Date of Patent: Jul. 17, 2018

(54) DATA COLLECTION FOR CREATING APPAREL SIZE DISTRIBUTIONS

(71) Applicant: Amazon Technologies, Inc., Seattle, WA (US)

(72) Inventors: Huafeng Jin, Sammamish, WA (US); Fei Zhao, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 569 days.

(21) Appl. No.: 14/676,611

(22) Filed: Apr. 1, 2015

(65) Prior Publication Data
US 2016/0292765 A1 Oct. 6, 2016

(51) Int. Cl.
*G06Q 30/00* (2012.01)
*G06Q 30/06* (2012.01)

(52) U.S. Cl.
CPC ..... *G06Q 30/0641* (2013.01); *G06Q 30/0621* (2013.01); *G06Q 30/0623* (2013.01); *G06Q 30/0629* (2013.01); *G06Q 30/0643* (2013.01)

(58) Field of Classification Search
CPC .......... G06Q 30/06; G06Q 30/0601–30/0643; G06Q 30/08; G06F 17/30; G06F 17/30011; G06F 17/3002; G06F 17/30023; G06F 17/30058; G06F 17/30061; G06F 17/30067; G06F 17/3007; G06F 17/30091; G06F 17/30115
See application file for complete search history.

(56) References Cited

U.S. PATENT DOCUMENTS

| 2007/0011173 A1* | 1/2007 | Agostino ............... A43D 1/02 |
| 2009/0182612 A1 | 7/2009 | Challener et al. |
| 2009/0234489 A1* | 9/2009 | Healy ................... G06Q 30/02 700/130 |

(Continued)

FOREIGN PATENT DOCUMENTS

WO WO2012016052 2/2012

OTHER PUBLICATIONS

Amongst Promises of a Perfect Fit, What Fits and What Doesn't? By Guest Contributor. Dec. 19, 2012 (Year: 2012).*

(Continued)

*Primary Examiner* — William J Allen
(74) *Attorney, Agent, or Firm* — Lee & Hayes, PLLC

(57) ABSTRACT

Collecting dimension data (e.g., height, chest size, etc.) associated with users and leveraging the dimension data to generate and display size distributions in association with products in an online marketplace is described. The size distributions may summarize data so that users may make sizing decisions based on users with similar user dimensions who acquired a same garment. The size distributions may summarize data so that a user may compare values corresponding to ranges of user dimensions in the context of a size of garment. The values may be determined based on adjusting a baseline value based at least in part on a number of users who acquire a garment, return a previously acquired garment, or provide negative feedback about the size of the garment. Graphical representations, such as pie charts, bar charts, etc., that are representative of the size distributions may be presented to users for providing contextual recommendations and/or information to streamline online shopping transactions.

20 Claims, 9 Drawing Sheets

(56) References Cited

U.S. PATENT DOCUMENTS

| | | | |
|---|---|---|---|
| 2011/0099122 A1 | 4/2011 | Bright et al. | |
| 2012/0030061 A1* | 2/2012 | Lu | G06Q 30/00 |
| | | | 705/26.7 |
| 2012/0030062 A1* | 2/2012 | Stauffer | G06Q 30/00 |
| | | | 705/26.7 |
| 2015/0081472 A1* | 3/2015 | Levin | G06Q 30/0623 |
| | | | 705/26.7 |
| 2015/0254680 A1* | 9/2015 | Scoles | G06Q 30/0201 |
| | | | 705/7.29 |
| 2016/0019626 A1* | 1/2016 | Pham | G06Q 30/0631 |
| | | | 705/26.7 |

OTHER PUBLICATIONS

The PCT Search Report and Written Opinion dated May 27, 2016 for PCT application No. PCT/US20156/025038, 12 pages.

\* cited by examiner

US 10,026,115 B2

DATA COLLECTION FOR CREATING APPAREL SIZE DISTRIBUTIONS

BACKGROUND

Online shopping has transformed retail in many ways. However, apparel is one area where consumers have not fully adopted the online shopping model. Consumers lack confidence in buying apparel online because of various concerns that are unique to the apparel industry. For instance, the apparel industry lacks size standardization. For example, a size medium from one clothing manufacturer is not necessarily the same as a size medium from another manufacturer, making it difficult for a consumer to know whether a garment purchased online will fit. In brick-and-mortar stores, consumers can use fitting rooms to try on various garments prior to purchasing any of the garments. However, in online shopping, consumers do not have the opportunity to try on desired garments before they buy the garments. Accordingly, clothing purchased online is returned at a significantly higher rate than clothing purchased in brick-and-mortar stores and similar insecurities cause many customers to abandon online clothing purchases prior to completing them.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
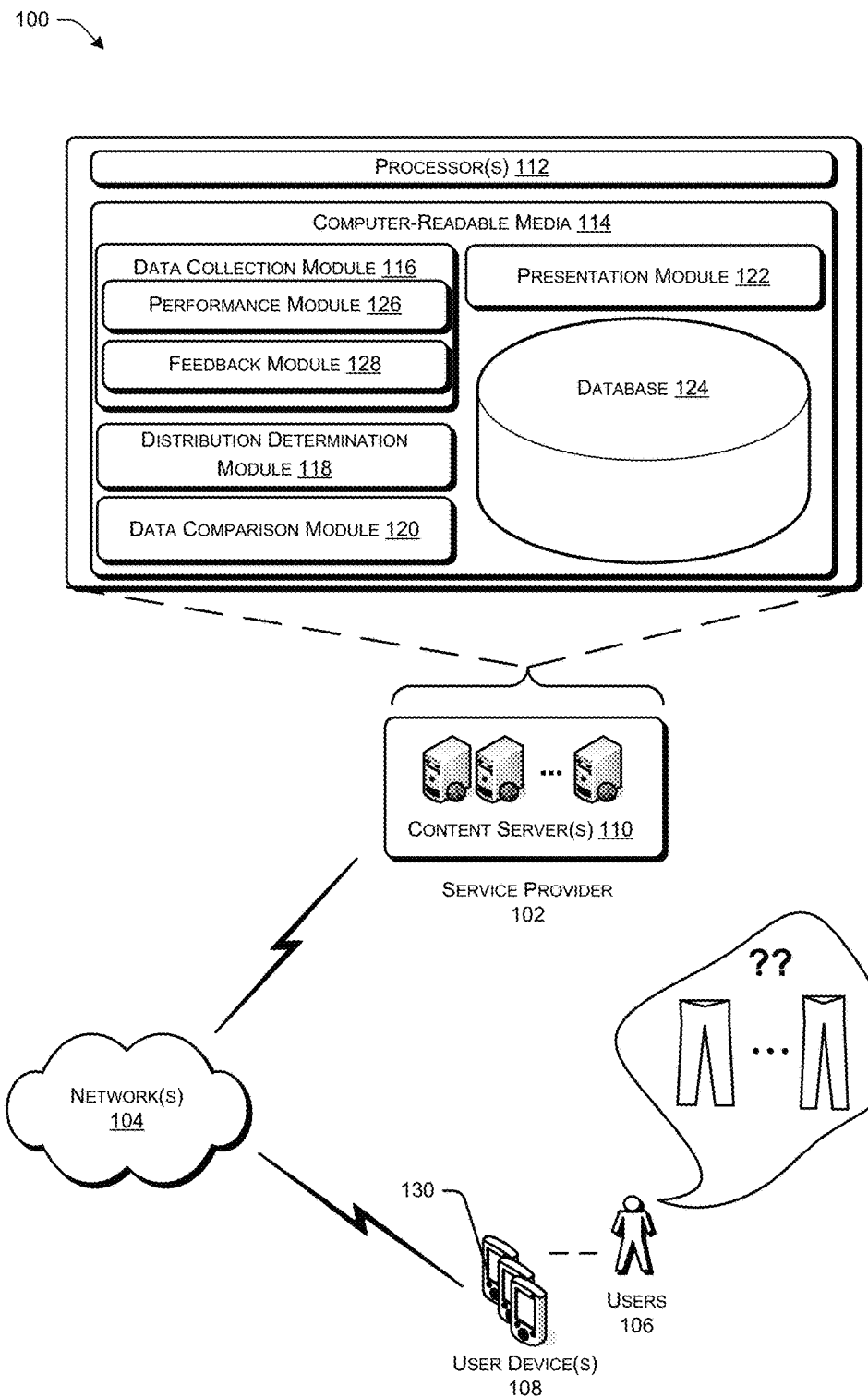
FIG. 1 is a diagram showing an example system for generating distributions associated with sizes of garments based at least in part on user dimensions.

Techniques described herein include collecting dimension data from users and leveraging the dimension data to generate useful distributions corresponding to attributes of products that relate to the dimension data to help users make purchasing decisions. In at least one example, the techniques described herein include collecting dimension data from users and leveraging the dimension data to create apparel size distributions that provide information about how garments of different sizes correspond to collected dimension data associated with users. The apparel size distributions may be utilized to provide accurate information to help consumers select garments that are a correct size and fit consistent with consumer preferences. Accordingly, techniques described herein lead to increased purchasing confidence, reduced return rates, and improved user satisfaction to streamline online shopping transactions.

For the purpose of this discussion, products may include a variety of consumer goods such as garments, jewelry, handbags, etc. In at least one example, a garment may include any article of clothing (e.g., shirt, pant, shoe, hat, etc.). Garments may be offered for acquisition (e.g., purchase) in a plurality of sizes. Sizes may include any type of standardized designation (e.g., numbers (e.g., 2, 4, 6, etc.), measurements (e.g., 32, 34, etc.), letters (e.g., XS, S, M, etc.), etc.). Standardized designations may vary based on location (e.g., country, region, etc.). In at least one example, based at least in part on receiving an indication that a user is interested in a garment of a particular size, one or more graphical representations of distributions associated with that particular size may be presented to the user to help the user decide which size of garment to purchase. The graphical representations may summarize data such that a user may easily compare sizes in the context of user dimensions, as described below. The graphical representations may include pie charts, bar charts, pictorial representations, etc.

The distributions may represent distributions for comparing values corresponding to ranges of dimensions in a context of a size or sizes in the context of a user dimension. User dimensions include height, weight, shoulder size, chest size (e.g., width or circumference), waist size (e.g., width or circumference), wrist size (e.g., width or circumference), etc. Units associated with user dimensions may vary depending on location (e.g., country, region, etc.) of the users 106. User dimensions may be quantitative (e.g., measurements) or qualitative (e.g., descriptions). For instance, height may be indicated as a measurement, such as 5'11", or a qualitative description, "tall." Each user dimension may be associated with a plurality of ranges of user dimensions. Ranges of user dimensions describe a subset of dimensions that make up the user dimension (e.g., individual height measurements associated with the user dimension of height, individual measurements associated with the user dimension of chest size, etc.). For example, if height is the user dimension, the ranges of user dimensions may represent various height measurements (e.g., 5'1", 5'6", 5'11", etc.). In at least one example, when an individual user dimension is within a predetermined threshold of a particular range (e.g., 5'1"), the user dimension may be associated with the particular range (e.g., 5'1"). As another example, if weight is the user dimension, the range of user dimensions may represent various weights (e.g., 110 pounds, 120 pounds, etc.). In at least one example, when an individual user dimension is within a predetermined threshold of a particular range (e.g., 110 pounds), the user dimension may be associated with the particular range (e.g., 110 pounds). In another example, when an individual user dimension is within a predetermined range (e.g., 110-120 pounds), the user dimension may be associated with the predetermined range (e.g., 110-120 pounds).

Depending on a type of garment, intended gender of a garment, etc., the user dimensions used to generate distributions may vary. In at least one example, neck size, height, and weight may be used to generate distributions associated with a dress. In another example, waist size, height, weight, and thigh size may be used to generate distributions associated with a pair of pants.

The techniques described herein may collect data associated with a plurality of users of an online shopping service provider. Individual users of the plurality of users may purchase items (e.g., goods, services, etc.) over a computer network, as described below. Based at least in part on purchasing items over the computer network, the individual users may receive the items by physical mail. In some examples, the data may include user dimensions associated with individual users of the plurality of users, performance data, feedback data, etc. Techniques described herein may leverage the data associated with the plurality of the users to determine distributions that correspond to sizes and/or brands of garments or user dimensions. In at least one example, the distributions may summarize data such that a user may easily compare ranges of user dimensions in the context of a particular size. In other examples, the distributions may summarize data such that a user may easily compare individual sizes of a plurality of sizes in the context of a particular range of a user dimension. The distributions of ranges of the dimensions corresponding to sizes of the garment may be determined based at least in part on determining baseline values based on a number of users having particular ranges of user dimensions who acquire a garment in a particular size. In some examples, each time a user having a particular range of a user dimension acquires a garment in the particular size, a baseline value associate with the particular range may be incremented. Each time a user having the particular range of a user dimension returns a garment in the particular size, the baseline value may be decremented. Similarly, each time a user having the particular range of a user dimension provides negative feedback about a garment in the particular size, the baseline value may be decremented. The techniques described herein may cause graphical representations of the distributions to be presented to the users and/or make size recommendations to the users based on the users' dimensions.

FIG. 1 is a diagram showing an example system 100 for generating distributions associated with sizes of garments based at least in part on user dimensions. More particularly, the system 100 may include a service provider 102, one or more network(s) 104, one or more users 106, and one or more user devices 108 associated with the one or more users 106.

As shown, the service provider 102 may include one or more content server(s) 110, which may include one or more processor(s) 112 and computer-readable media 114. The computer-readable media 114 may include a data collection module 116, a distribution determination module 118, a data comparison module 120, a presentation module 122, and a database 124. The data collection module 116 may include a performance module 126 and a feedback module 128. The service provider 102 may be implemented in a non-distributed computing environment or may be implemented in a distributed computing environment, possibly by running some modules on user devices or other remotely located devices.

In various examples, the service provider 102 may provide items (e.g., products, services, etc.) to users 106 (e.g., consumers) on behalf of itself, other users 106 (e.g., merchants), etc. For the purpose of this discussion, the items may include apparel items such as garments as described above. The service provider 102 described herein may cause one or more user interfaces to be presented to users 106 that promote or feature the items offered by the service provider 102 or the other users 106. The service provider 102 may collect data associated with a plurality of users 106 who acquire the items offered by the other users 106. In some examples, the data may include user dimensions associated with individual users 106 of the plurality of users 106, performance data, feedback data, etc. The service provider 102 may leverage the data associated with the plurality of the users 106 to determine distributions that correspond to sizes and/or brands of garments or user dimensions. In at least one example, the distributions may summarize data such that a user 106 may easily compare ranges of user dimensions in a context of a particular size. For instance, a distribution may summarize percentages of users 106 corresponding to various heights who acquired a garment in a particular size. In other examples, the distributions may summarize data such that a user 106 may easily compare individual sizes of a plurality of sizes in the context of a particular range of a user dimension. For instance, a distribution may summarize percentages of users 106 within a range of a user dimension (e.g., 5'10" height) who acquired a garment in a plurality of sizes. The service provider 102 may use the distributions to cause contextual information to be presented to the users 106 and/or make size recommendations to the users 106 based on the user's 106 dimensions.

In some embodiments, the network(s) 104 may be any type of network known in the art, such as the Internet. Moreover, the service provider 102 and/or the users 106 may communicatively couple to the network(s) 104 in any manner, such as by a wired or wireless connection. The network(s) 104 may facilitate communication between the content server(s) 110 and/or the user devices 108 associated with the users 106.

The users 106 may include consumers interacting with one or more user interfaces on a display 130 of a user device 108 that present one or more items on behalf of other users 106 (e.g., merchants) and/or the service provider 102 for acquisition. In various examples, the consumers may acquire the items on behalf of the merchants and/or service provider 102 by actuating a control on a user interface presented on the display 130 of a user device 108 to purchase the items. The control may be associated with a hyperlink that directs the user 106 to a new user interface and prompts the user 106 to input information for purchasing the item (e.g., banking information, etc.) and, in some examples, user dimensions.

As described above, the users 106 may include merchants. In various examples, the merchants may be any individual or entity that is a source or a distributor of items that may be acquired by the users 106 (e.g., consumers). For example, the merchants may include entities that provide products or services to consumers, which may be offered or promoted directly by the merchants or by the service provider 102 or on behalf of the merchants. The merchants may also offer those items via a physical location (e.g., a brick-and-mortar store) or a merchant-branded merchant site (e.g., website). The merchants may provide items to the users 106 with the assistance of one or more user devices 108, which may include any type of device. Moreover, the merchants may interact with the service provider 102 via a site (i.e., a website), a self-service merchant portal, a self-service interface, or in any other manner.

In some examples, the users 106 may operate corresponding user devices 108 to perform various functions associated with the user devices 108, which may include at least some of the operations and/or modules discussed above with respect to the service provider 102.

The service provider 102 may be any entity, server(s), platform, etc., that provides items (e.g., products, services, etc.) to users 106 (e.g., consumers) on behalf of other users 106 (e.g., merchants). Moreover, and as shown, the service provider 102 may include one or more content server(s) 110, which may include one or more processor(s) 112 and computer-readable media 114. The content server(s) 110 may also include additional components not listed above that may perform any function associated with the content server(s) 110. In various embodiments, each of the content server(s) 110 may be any type of server, such as a network-accessible server.

In various examples, the processor(s) 112 may execute one or more modules and/or processes to cause the content server(s) 110 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. Additionally, each of the processor(s) 112 may possess its own local memory, which also may store program modules, program data, and/or one or more operating systems.

In at least one configuration, the computer-readable media 114 of the content server(s) 110 may include any components that may be used to facilitate interaction between the service provider 102 and the users 106. For example, the computer-readable media 114 may include the data collection module 116, the distribution determination module 118, the data comparison module 120, the presentation module 122, and the database 124. The data collection module 116 may include the performance module 126 and the feedback module 128, as described above. Depending on the exact configuration and type of the content server(s) 110, the computer-readable media 114 may also include volatile memory (such as RAM), non-volatile memory (such as ROM, flash memory, miniature hard drive, memory card, or the like), or some combination thereof.

The data collection module 116 may collect data from the users 106 (e.g., consumers, merchants, etc.), the service provider 102, etc. In at least one example, the data collection module 126 may collect user dimensions associated with the users 106. User dimensions include height, weight, shoulder size, chest size (e.g., width or circumference), bust size, waist size (e.g., width or circumference), hip size (e.g., width or circumference), neck size (e.g., length or circumference), arm size (e.g., length or circumference), thigh size (e.g., length or circumference), calf size (e.g., length or circumference), torso size (e.g., length), foot size (e.g., width, length, circumference at various locations, toe length), hand size (e.g., width, length, circumference at various locations, finger length), ankle size (e.g., width or circumference), wrist size (e.g., width or circumference) etc. Other examples of user dimensions are possible without departing from the scope of this disclosure.

In at least some examples, the user 106 may input his or her user dimensions during or after a creation of a user profile associated with the service provider 102. The user dimensions may be associated with the user profile as default user dimensions until the user 106 changes the user dimensions. In other examples, the user 106 may input his or her dimensions responsive to a request from the data collection module 116. For instance, the data collection module 116 may request user dimensions from the user 106 at a substantially same time as the user 106 purchases a garment, at a time the user 106 provides user feedback associated with a garment, or at another time as prompted by an application. The user 106 may input the user dimensions to the service provider 102 in a self-service manner, such as via a site (i.e., a website, a portal, an interface, etc.) that is associated with the service provider 102 and that is accessible by the users 106. In some examples, the data collection module 116 may collect user dimensions using any of a number of different known sensors to perform a scan of all or a part of the user's body.

The data collection module 116 may collect additional information associated with users 106 such as user information and actions associated with a retail purchase account associated with a user 106 (e.g., purchases, sales, items on a saved-items list (i.e., a wish-list), browsing history, search history, recommendations, personal demographic information, location proximity, calendar information, etc.). In some examples, the data collection module 116 may leverage models to learn user dimensions from the additional information associated with the users 106. Additionally or alternatively, the service provider 102 may access and observe user information and actions associated with third party sources and systems (e.g., social networks, professional networks, partner webstore purchases, etc.). In at least one example, the data collection module 116 may access user dimensions from user 106 accounts or profiles associated with the third party sources and systems. The user information may be associated with the user profile and/or stored in the database 124, cloud storage system, or other data repository.

In the examples where the information is private or includes personally identifiable information (PII) that identifies or can be used to identify, contact, or locate a person and/or entity to whom such data pertains, a user 106 may be provided with notice that the systems and methods herein are collecting PII. Additionally, prior to initiating PII data collection, users 106 may have an opportunity to opt-in or opt-out of the PII data collection. For example, a user 106 may opt-in to the PII data collection by taking affirmative action indicating that he or she consents to the PII data collection. Alternatively, a user 106 may be presented with an option to opt-out of the PII data collection. An opt-out option may require an affirmative action to opt-out of the PII data collection, and in the absence of affirmative user action to opt-out, PII data collection may be impliedly permitted. Furthermore, the service provider 102 may implement one or more security measures to protect PII from untrusted merchants or other untrusted parties.

The data collection module 116 may receive the data from users 106 and protect the data from untrusted users 106. In at least one example, the data collection module 116 may store the data from the users 106 without any indication of an identity of the users 106 associated with the data. That is, the data collection module 116 may anonymize the data so that the data may be shared with other service providers 102, merchants, intermediary marketplaces, etc. to improve performance for all users 106.

In at least one example, the data collection module 116 may leverage the user dimensions and user information and actions associated with retail purchase accounts to learn associations between users 106 who have particular user dimensions and products and/or brands that they acquire. For instance, the data collection module 116 may leverage particular user dimensions and user information and actions associated with retail purchase accounts to train models using machine learning that users 106 having the particular user dimensions repeatedly purchase specific brands, specific products, specific sizes, etc. In additional or alternative examples, the data collection module 116 may leverage user information and actions associated with retail purchase accounts to train models using machine learning to predict trends associated with brands. For instance, if user information and actions associated with retail purchase accounts indicate that users having a particular range of a user dimension buy a particular size of a particular brand, we can predict that the particular size is associated with users 106 having the particular range of the user dimension. These learned associations may be stored in the database 124, cloud storage system, or other repository and may be accessed by the data comparison module 120 for recommending sizes of garments to users 106. In at least one example, the service provider 102 may provide at least some of the data as feedback to merchants about purchasing trends, sizing trends, etc. so that merchants can utilize the information to improve their products and associated product information.

The performance module 126 may determine a past or current performance of garments. In some embodiments, performance may refer to whether a garment is acquired by a user 106 and/or whether a garment is returned by a user 106. Examples of performance data may correspond to the actual performance of a garment, which may include an extent to which the garment was viewed, clicked through, accessed, acquired (e.g., sold), added to a saved-items list (e.g., a wish list), etc., and/or the revenue or profits resulting from the acquisition of the garment. Additionally, performance data may correspond to the extent to which users 106 return previously acquired garments. In some examples, the performance module 126 may organize the performance data based at least in part on individual sizes and/or brands. Performance data may be stored in the database 124, cloud storage system, or other data repository. The distribution determination module 118 may leverage the performance data to determine a distribution corresponding to sizes and/or brands of garments or user dimensions.

The feedback module 128 may receive, obtain, and/or determine user feedback from users 106. More particularly, the feedback module 128 may leverage user feedback (e.g., user-provided feedback, user reviews, user ratings, user responses to surveys/questionnaires, etc.), to determine preferences, interests, likes/dislikes, complaints, etc., of the users 106. The feedback module 128 may receive feedback data based at least in part on prompting a user 106 for feedback at a time after the user 106 acquired the garment, at a same time or a time after the user 106 returns the garment, etc. Users 106 may provide feedback via a self-service website, application or browser on a user device 108, customer service, etc. Users 106 may provide feedback by inputting information into a free form text area, by selecting an option from a set of predetermined options (e.g., multiple choice, dropdown menu, etc.). In at least one example, the feedback data may indicate whether a garment fit or did not fit. Feedback data may be stored in the database 124, cloud storage system, or other data repository. The distribution determination module 118 may leverage the feedback data to determine a distribution corresponding to sizes and/or brands of garments or user dimensions.

The distribution determination module 118 may determine distributions corresponding to sizes and/or brands of garments or user dimensions. In some examples, the distributions may be specific to size and brand. In at least one example, the distributions may be used to compare ranges of user dimensions associated with individual user dimensions in a context of a particular size. For instance, a distribution for the user dimension of height and a particular brand of a garment in a size medium may display a data distribution indicative of a number of users 106 and the range of user dimensions (e.g., heights) of the users 106 who acquired the garment in the size and did not return the garment or provide negative user feedback about the sizing of the garment (i.e., unsatisfied users). In additional or alternative examples, the distributions may be used to compare individual sizes of a plurality of sizes in a context of a particular range of a user dimension. For instance, a distribution for a particular range of a user dimension and a particular garment may display a data distribution indicative of a number of users 106 within the particular range of the user dimension who acquired the garment in each size that the garment is available and did not return the garment or provide negative user feedback about the sizing of the garment. The distributions may be stored in the database 124, cloud storage system, or other data repository.

The data comparison module 120 may compare the user dimensions with the distributions and recommend sizes of garments to users 106. In at least one example, the data comparison module 120 may determine that a number of the plurality of users within a range of a user dimension that is a same range associated with the dimensions of the user is greater than a number of a plurality of users within the other ranges. In other examples, the data comparison module 120 may determine that a number of the plurality of users within a range of a dimension that is a same range associated with the dimensions of the user is less than a number of a plurality of users within the other ranges.

The presentation module 122 may cause one or more graphical representations to be presented to the users 106. The graphical representations may visually summarize the distributions created by the distribution determination module 118. As described below, the graphical representations may include pie charts, bar charts, pictorial representations, etc. In some examples, the presentation module 122 may cause the one or more graphical representations to be presented to the users 106 without any user interaction. In other examples, the presentation module 122 may cause the one or more graphical representations to be presented to the users 106 responsive to a user 106 actuating a control or hyperlink on a user interface associated with the user device(s) 108.

Figure 2:
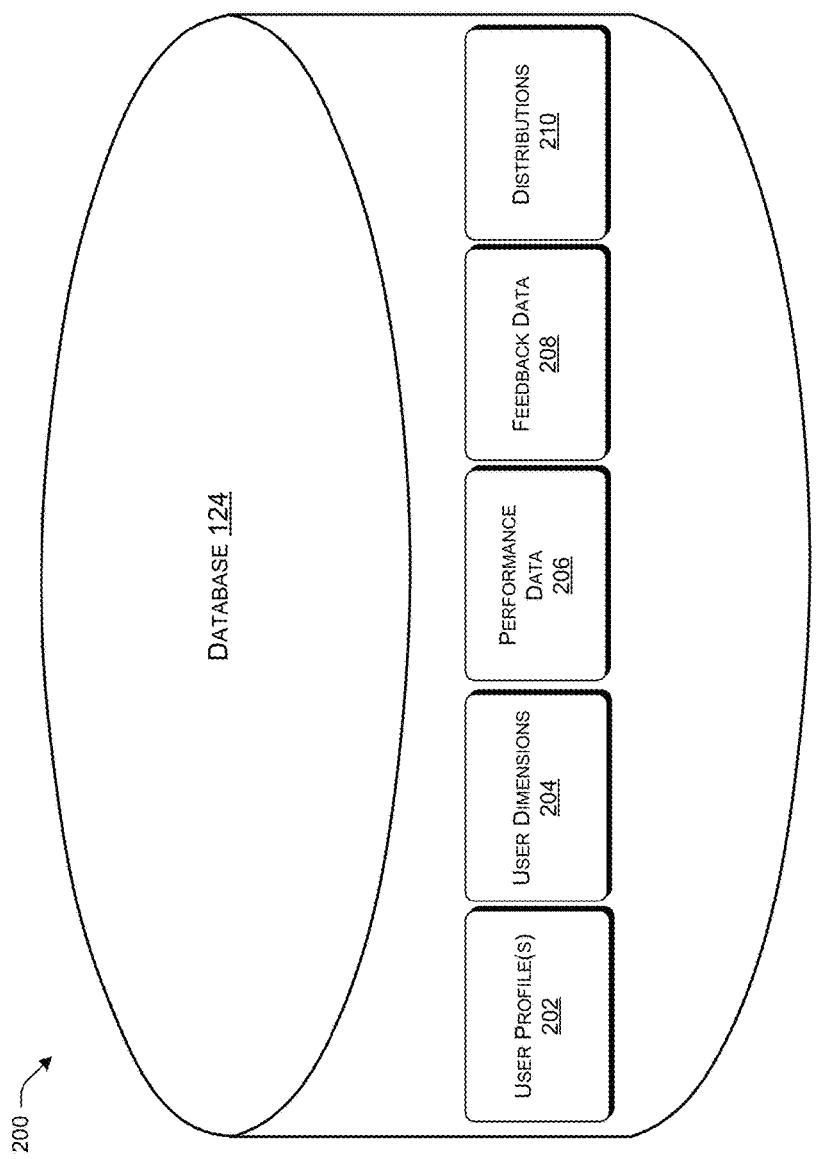
FIG. 2 is a diagram showing an example of a database associated with the example system of FIG. 1.

FIG. 2 is a diagram 200 showing an example of database 124 that may be associated with the example system of FIG. 1. The database 124 may store at least some data including data associated with user profiles 202, user dimensions 204 associated with users 106, performance data 206 associated with garments, feedback data 208 associated with garments, distributions 210, etc. User profile(s) 202 may correspond to one or more user profiles associated with the service provider 102. In some examples, a user profile 202 may include user dimensions 204 associated with a user 106 as described above. Additionally, a user profile 202 may include additional information associated with a user 106 such as user information and actions associated with a retail purchase account associated with a user 106, user information and actions associated with third party sources and systems, etc. In at least one example, a user 106 may not have a user profile 202 and accordingly, the user dimensions 204 may be stored in the database independent of a user profile 202 (as is shown in FIG. 2). Performance data 206 may correspond to the actual performance of a garment, which may include an extent to which the garment was viewed, clicked through, accessed, acquired (e.g., sold), added to a saved-items list (e.g., a wish list), etc., and/or the revenue or profits resulting from the acquisition of the garment. Additionally, performance data 206 may correspond to the extent to which users 106 return previously acquired garments as described above. Feedback data 208 may correspond to preferences, interests, likes/dislikes, complaints, etc., of the users 106 based at least in part on user feedback provided by the users 106. In at least one example, the feedback data 208 may include user feedback about the fit of a garment. Distributions 210 may correspond to distributions of data for comparing ranges of a particular dimension or sizes in which a garment is offered. As described above, distributions 210 may be specific to size and/or brand. In additional or alternative examples, at least some of the data may be stored in a cloud storage system or other data repository.

FIGS. 3 and 5-7 describe example processes for collecting data associated with a plurality of users 106 for creating apparel size distributions 210. The example processes are described in the context of the environment of FIGS. 1 and 2 but are not limited to those environments. The processes are illustrated as logical flow graphs, each operation of which represents a sequence of operations that may be implemented in hardware, software, or a combination thereof. In the context of software, the operations represent computer-executable instructions stored on one or more computer-readable media 114 that, when executed by one or more processors 112, perform the recited operations. Generally, computer-executable instructions include routines, programs, objects, components, data structures, and the like that perform particular functions or implement particular abstract data types.

The computer-readable media 114 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media 114 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

Figure 3:
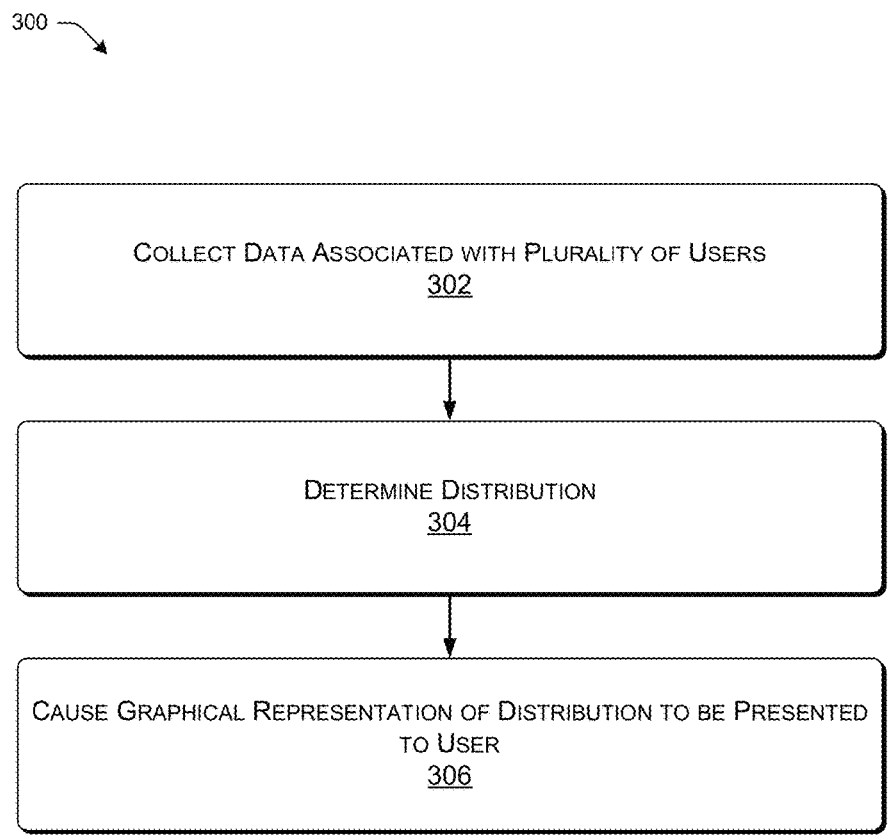
FIG. 3 is a flow diagram showing an illustrative process to generate a graphical representation of a distribution associated with a size of a garment.

FIG. 3 is a flow diagram showing an illustrative process 300 to generate a graphical representation of a distribution 210 associated with a size of a garment.

Block 302 illustrates collecting data associated with a plurality of users 106. For each size of a plurality of sizes associated with a garment, the data collection module 116 may collect data associated with a plurality of users 106 who acquired the garment in the size. Furthermore, the performance module 126 may collect performance data 206 including a number of users 106 who returned the garment in the size and the feedback module 128 may collect feedback data 208 including negative user feedback relating to the size or fit of the garment. The data collection module 116 may also collect user dimensions associated with the plurality of users 106 who acquired the garment in the size. For instance, as described above, the dimensions may include at least one or more of height, weight, chest size, waist size, or wrist size of individual users 106 of the plurality of users 106. In some examples, the data collection module 116 may collect user dimensions 204 based at least in part on requesting dimensions from individual users 106 of the plurality of users 106 in response to receiving a request from the user to acquire the garment or receiving user feedback associated with the garment. In other examples, the data collection module 116 may access the user dimensions 204 from user profile(s) 202 associated with the users 106.

Block 304 illustrates determining a distribution 210. Based at least in part on collecting the data, the distribution determination module 118 may determine distributions corresponding to sizes and/or brands of garments or user dimensions. In at least one example, the distributions 210 correspond to ranges of user dimensions associated with individual user dimensions in the context of a particular size. In additional or alternative examples, the distributions 210 may be used to compare individual sizes of a plurality of sizes in the context of a particular range of a user dimension. The distribution determination module 118 may determine the values corresponding to each of the ranges of the user dimensions based at least in part on a number of users 106 within a range of a user dimension who acquired the garment in the size. In at least one example, the distribution may refrain from including data associated with unsatisfied users 106. In some examples, the distribution determination module 118 may increment the value based at least in part on a number of users 106 within the range of the user dimension who acquired the garment. In some examples, the distribution determination module 118 may decrement the value based at least in part on a number of users 106 within the range of the user dimension who at least returned the garment or provided negative user feedback related to the fit of the garment.

Block 306 illustrates causing a graphical representation of the distribution 210 to be presented to a user 106. The presentation module 122 may cause a graphical representation of the distribution 210 to be presented to a user 106. In some examples, the presentation module 122 may cause the graphical representations to be presented to the users 106 responsive to a user 106 indicating an interest in a particular size. For instance, a user 106 may indicate that he or she is interested in a size medium by entering the size into a free form box, selecting the size from a list of options, etc., and the presentation module 122 may cause one or more graphical representations that correspond to the size medium to be presented to the user 106. In other examples, a user 106 may indicate that he or she is interested in a particular range of a physical dimension. For instance, the user 106 may indicate his or her user dimensions 204 quantitatively (e.g., measurements) or qualitatively by inputting the user dimensions 204 into free form boxes, selecting dimensions from a list of options, etc. Based in part on receiving the indication from the user 106, the presentation module 122 may generate and cause one or more graphical representations of the distributions associated with the particular range to be presented to the user 106 to aid the user 106 in making a selection of the garment in one of the sizes. In at least one example, the user 106 may actuate a control or hyperlink on the user interface to view the graphical representations associated with a size or range of a user dimension.

Graphical representations may include pie charts, bar charts, other pictorial representations that visually summarize a distribution 210, etc. In at least one example, the graphical representations may include sample sizes to assist users 106 in understanding the accuracy and/or precision of the data. A pie chart may represent a circular chart including a plurality of sectors. In at least one example, for a particular size associated with a particular brand, the pie chart may be divided into sectors that represent a value associated with a proportion of users 106 within a range of a user dimension who purchased a garment of the particular size and particular brand. In such example, the individual sectors of the plurality of sectors may correspond to a range of a user dimension. The individual sectors may have central angles that are proportional to individual values that correspond to the individual ranges. As a nonlimiting example, for a medium sized garment sold by Ralph Lauren®, a pie chart may visually summarize that 30% of the purchasers were 5'6", 25% of the purchasers were 5'7", 20% of the purchasers were 5'5", etc. In such example, the sector corresponding to the purchasers who were 5'6" may comprise 120° of the circle and may have a slightly wider central angle than the purchasers who are 5'7" and 5'5".

Figure 4A:
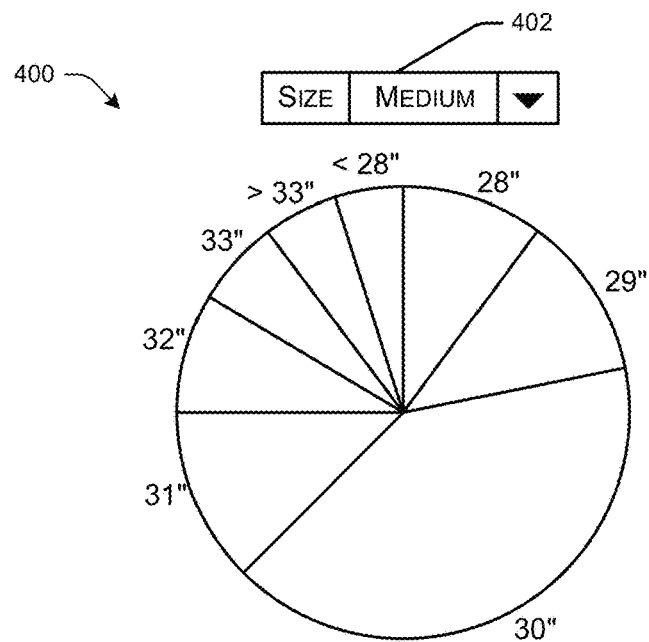
FIG. 4A is a diagram showing an example of a graphical representation of a distribution associated with a size of a garment based at least in part on user dimensions.

FIG. 4A is a diagram showing an example of a graphical representation 400 of a distribution 210 associated with a size of a garment based at least in part on user dimensions 204. As described above, the presentation module 122 may cause the graphical representation of the distribution to be presented as a pie chart. Graphical representation 400 is a pie chart representing a distribution of data associated with a waist dimension of the user dimensions 204 in a context of a size medium garment. In at least one example, a user 106 may select a size via a drop down menu 402, slider, set of choices, etc. In some examples, the size may be auto-populated based at least in part on user information stored in the database 124 and/or associated with a user profile 202. As shown, users 106 having waists measuring between 29 inches and 31 inches acquired the garment more commonly than users 106 with waists measuring less than 28 inches or greater than or equal to 33 inches. Particularly, approximately 33% of the users 106 who purchased a size medium had waists measuring 30 inches, 20% of users 106 who purchased a size medium had waists measuring 29", and 20% of users 106 who purchased a size medium had waists measuring 31". Accordingly, a user 106 who has a waist measuring 30 inches may find that the garment in a size medium is more likely to fit him or her than a user 106 who has a waist measuring 35 inches.

Figure 4B:
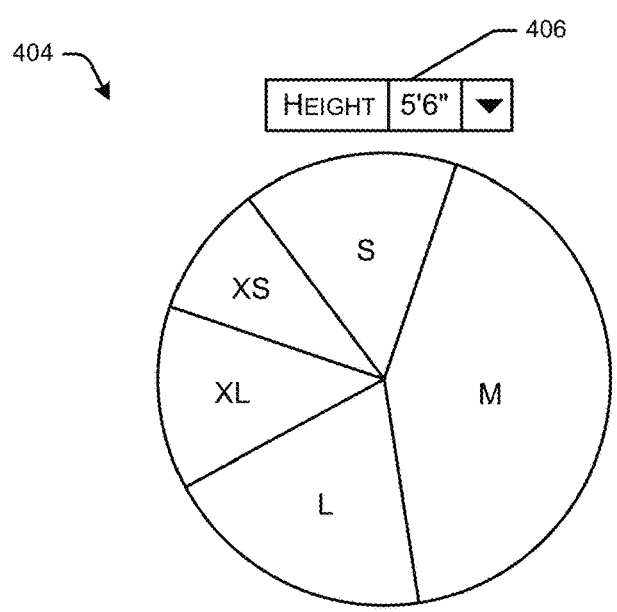
FIG. 4B is a diagram showing an example of a graphical representation of a distribution associated with a range of a user dimension.

FIG. 4B is a diagram showing an example of a graphical representation 404 of a distribution associated with a range of a user dimension. The pie chart may visually summarize a distribution 210 based on a range of a user dimension. A user 106 may select a range of a user dimension via a drop down menu 406, slider, set of choices, etc. As illustrated in graphical representation 404, the user 106 may select a range of 5'6" for the user dimension of height. In some examples, the range may be auto-populated based at least in part on user dimensions 204 stored in the database 124 and/or associated with a user profile 202. In other examples, names of family members or other users 106 known to have a relationship with the user 106 may be selected and corresponding user dimensions 204 may be used for generating the graphical representation 404. The pie chart may be divided into sectors to illustrate values representative of a proportion of users 106 with the same range of the user dimension who purchased a same garment. In such example, the individual sectors of the plurality of sectors may correspond to individual sizes of the plurality of sizes associated with the garment. The individual sectors may have central angles that are proportional to individual values that correspond to the individual sizes. As shown, for a range of a user dimension associated with the user dimension of height (e.g., 5'6"), graphical representation 404 visually summarizes that approximately 30% of the purchasers purchased a size medium, approximately 20% of the purchasers purchased a size small, approximately 25% of the purchasers purchased a size large, approximately 10% of the purchasers purchased a size extra-small, and approximately 15% of the purchasers purchased a size extra-large, etc. In such example, the sector corresponding to the purchasers who are 5'6" and purchased a size medium may comprise approximately 120° of the circle and may have a slightly wider central angle than the purchasers who purchased size small or large, as shown in FIG. 4B.

A bar chart may represent a chart including a plurality of bars. The bars the make up the bar chart may extend vertically or horizontally from an axis. In some examples, the bars may be grouped to show more than one user dimension in a same bar chart. In some examples, the bar chart may be multi-dimensional. In at least one example, the bar chart may visually summarize a distribution 210 based on a size and/or brand. For instance, for a particular size associated with a particular brand, the bar chart may include rectangular bars having lengths that are proportional to a value representative of the number of users 106 who purchased a garment of the particular size and particular brand. An individual bar of the plurality of bars may correspond to a range of a user dimension and may have a length proportional to an individual value corresponding to the number of users within the range who acquired the garment in a particular size.

Figure 4C:
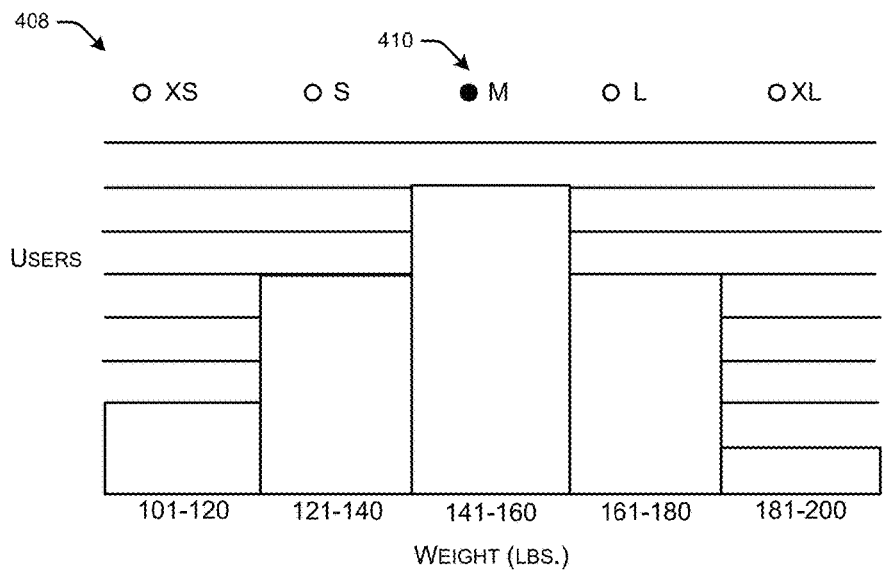
FIG. 4C is a diagram showing another example of a graphical representation of a distribution associated with a size of a garment based at least in part on user dimensions.

FIG. 4C is a diagram showing an example of a graphical representation 408 of a distribution 210 associated with a size of a garment based at least in part on user dimensions 204. Graphical representation 408 is a bar chart representing a distribution of data associated with a weight dimension of the user dimensions 204 and a size medium garment. Each of the bars in the bar chart represent a value that corresponds to a proportion of users 106 within the corresponding range of the user dimension (e.g., 101-120 pounds, 121-140 pounds, etc.) who acquired the associated garment and did not return the garment or provide negative feedback about the size of the garment. A user 106 may select a range of a user dimension via a drop down menu, slider, set of choices 410, etc. As illustrated in graphical representation 408, the user 106 may select a size medium. In some examples, the size may be auto-populated based at least in part on user information stored in the database 124 and/or associated with a user profile 202. As shown in FIG. 4C, a size medium garment represented by the graphical representation 401 has most frequently been purchased by users 106 weighing between 141-160 pounds. Accordingly, a user 106 who weighs 150 pounds may decide to order the garment in a size medium. Conversely, if the user 106 weighs 190 pounds, the user 106 may consider looking at distributions for other sizes to see if another size might fit that user 106 better than the size medium.

Figure 4D:
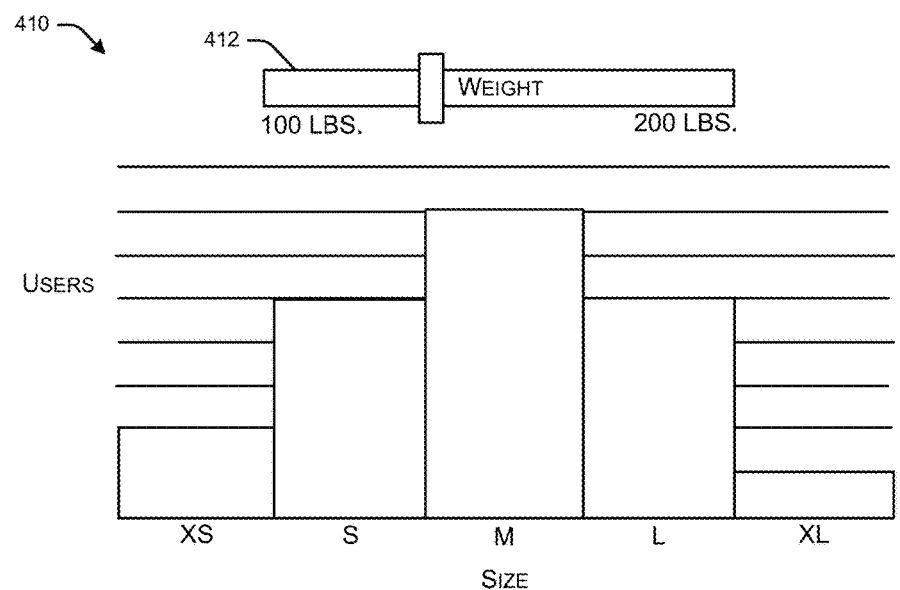
FIG. 4D is a diagram showing another example of a graphical representation of a distribution associated with a range of a user dimension.

FIG. 4D is a diagram 410 showing another example of a graphical representation of a distribution associated with a range of a user dimension. In some examples, the bar chart may visually summarize a distribution based on a range of a user dimension. A user 106 may select a range of a user dimension via a drop down menu, slider 412, set of choices, etc. As illustrated in graphical representation 410, the user 106 may place the slider in a range on the weight dimension slider bar. In some examples, the range may be auto-populated based at least in part on user dimensions 204 stored in the database 124 and/or associated with a user profile 202. For a particular range, the bar chart may include rectangular bars having lengths that are proportional to a value representative of the number of users 106 with the same range who purchased a same garment. That is, an individual bar of the plurality of bars may correspond to a size and may have a length proportional to an individual value corresponding to the number of users 106 with the same range who purchased the same garment in the size. As shown in FIG. 4D, fewer users 106 whose weight falls in the same range as the user 106 purchased extra-small or extra-large garments than users 106 whose weight falls in the same range as the user 106 who purchased small, medium, or large garments. As shown, most users 106 whose weight falls in the same range as the user 106 purchased a size medium.

In at least one example, the graphical representation may include a pictorial representation, such as an artistic rendition of a human body. As a non-limiting example, for a particular size associated with a particular brand, the presentation module 122 may cause a human body showing user dimensions 204 associated with a largest number of users 106 who purchased a garment of the particular size and particular brand to be presented. The aforementioned discussions and graphical representations 702 and 704 are illustrative of graphical representations that the presentation module 122 may cause to be presented. However other graphical representations may be employed to accomplish similar results. For instance, in at least one example, presentation and organization of the graphical representations and/or content in the graphical representations may vary based on location (e.g., country, region, etc.) of the users 106.

Figure 5:
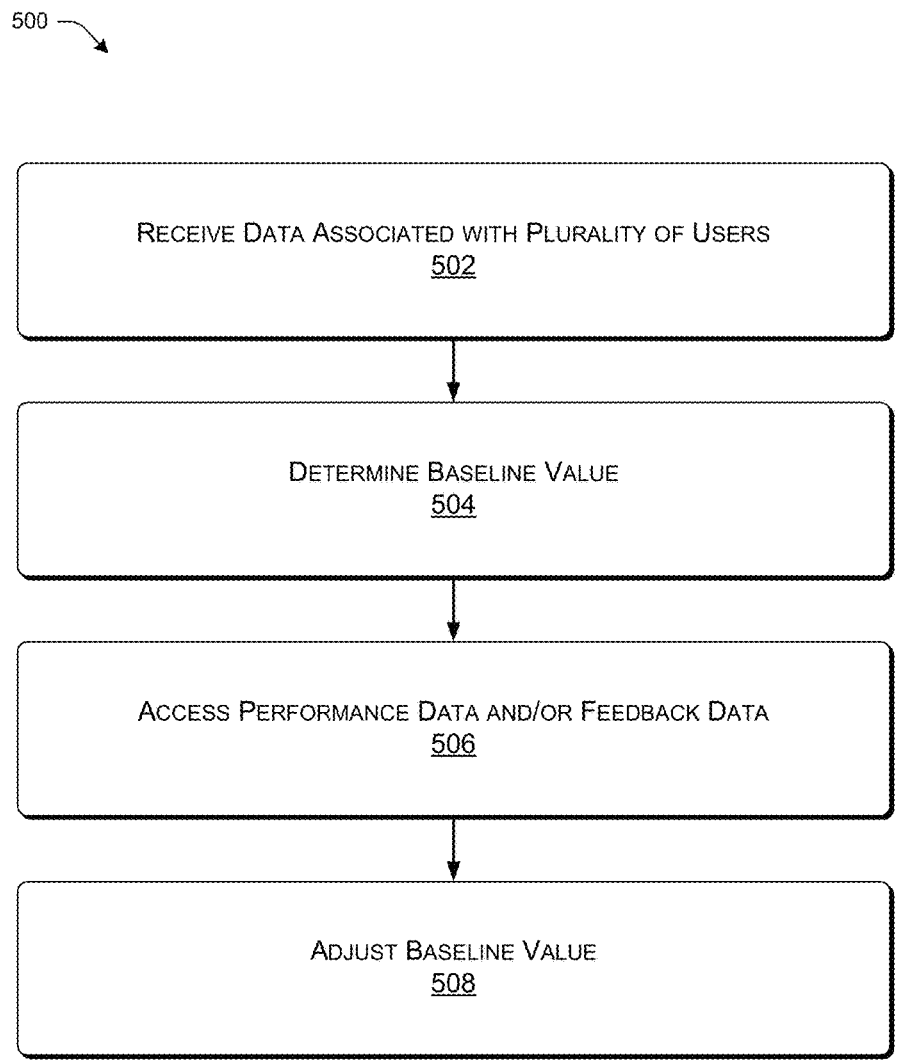
FIG. 5 is a flow diagram showing an illustrative process to determine baseline values that may be used for generating a distribution associated with the size and/or brand of a garment or user dimension.

FIG. 5 is a flow diagram 500 showing an illustrative process to determine baseline values that may be used for generating a distribution 210 associated with the size and/or brand of a garment or user dimension 204.

Block 502 illustrates receiving data associated with a plurality of users 106. As described above, the data collection module 116 may collect and/or receive data associated with a plurality of users 106. The data may include user dimensions 204 associated with a number of users 106 who acquired a garment in a particular size.

Block 504 illustrates determining a baseline value. The distribution determination module 118 may determine a baseline value based at least in part on a number of users 106 within a range of a user dimension who acquired the garment in the particular size. In at least some examples, each subsequent time a user 106 acquires a garment in the particular size, the distribution determination module 118 may increment the baseline value.

Block 506 illustrates accessing performance data 206 and/or feedback data 208. As described above, the performance module 126 may collect performance data 206 and the feedback module 128 may collect feedback data 208. In at least one example, the performance data 206 may include a number of users 106 who returned the garment. In at least one example, the feedback data 208 may include a number of users 106 who provided negative user feedback about the size of the garment. The distribution determination module 118 may access the performance data 206 and/or the feedback data 208 from the database 124, cloud storage system, or other data repository.

Block 508 illustrates adjusting the baseline value. The distribution determination module 118 may adjust the baseline value based at least in part on the performance data 206 and/or the feedback data 208. In at least one example, the distribution determination module 118 may decrement the baseline value each time a user 106 returns a garment of a particular size. In other examples, the distribution determination module 118 may decrement the baseline value based at least in part on a user 106 providing negative feedback about the size of the garment.

Figure 6:
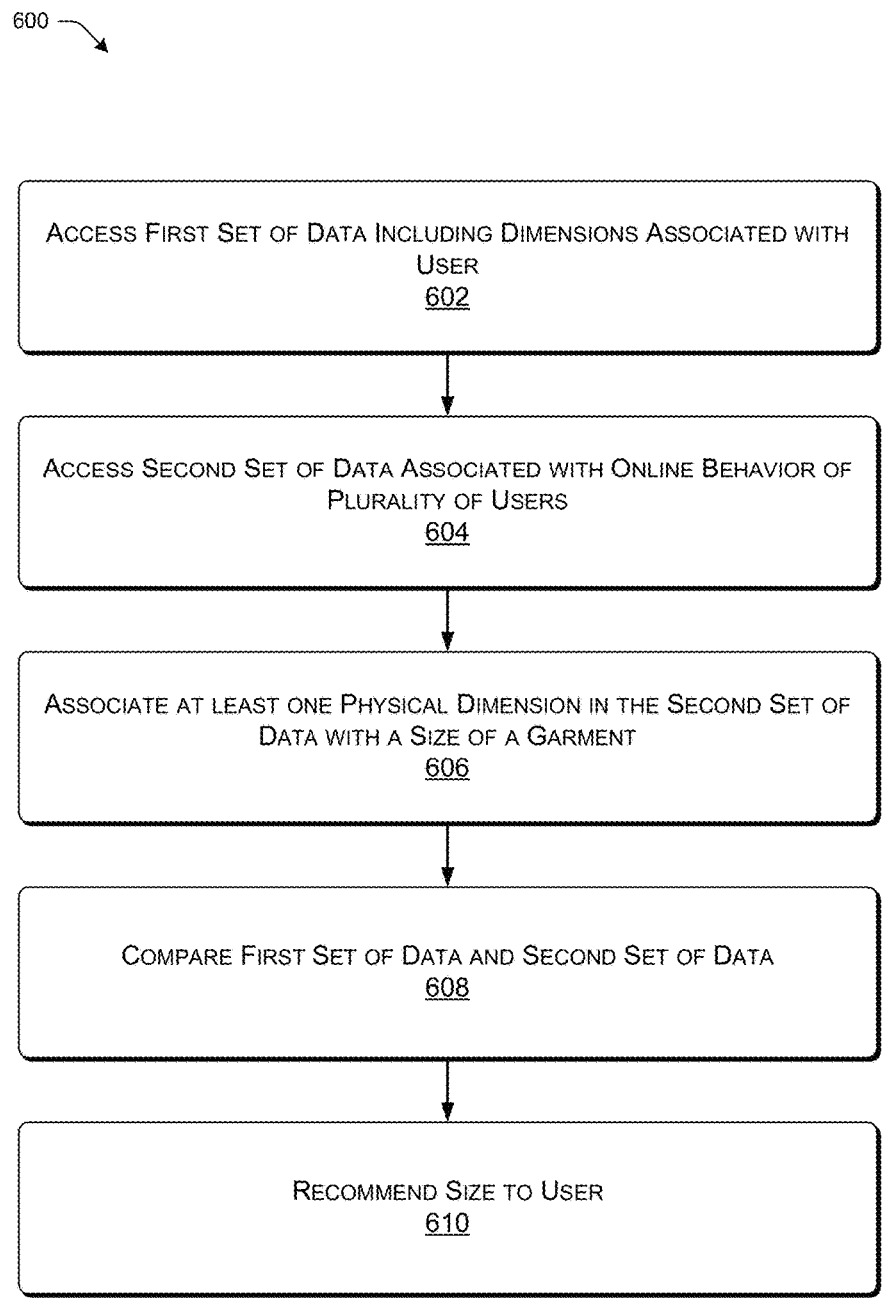
FIG. 6 is a flow diagram showing an illustrative process to recommend a size of a garment to a user.

FIG. 6 is a flow diagram 600 showing an illustrative process to recommend a size of a garment to a user 106.

Block 602 illustrates accessing a first set of data including dimensions 204 associated with a user 106. As described above, the data collection module 116 may collect user dimensions 204 and additional user information. In some examples, the user dimensions 204 and/or user information may be associated with a user profile 202. In such examples, the data collection module 116 may access the user dimensions 204 from the database 124, cloud storage, or other data repository. In other examples, the data collection module 116 may prompt the user 106 for his or her user dimensions 204. In at least some examples, the data collection module 116 may request the user dimensions 204 from the user 106 in response to receiving a request from the user 106 to acquire the garment or receiving user feedback associated with the garment.

Block 604 illustrates accessing a second set of data associated with online behavior of a plurality of users 106. As described above, the data collection module 116 may collect a second set of data associated with online behavior of a plurality of users 106 with respect to a garment available in a plurality of sizes. The second set of data may include a plurality of dimensions 204 associated with a plurality of users 106 who acquired the garment. Additionally, the second set of data may include a number of the plurality of users 106 who at least returned the garment or provided negative user feedback about the fit of the garment.

Block 606 illustrates associating at least one physical dimension in the second set of data with a size of a garment. In at least one example, the distribution determination module may associate dimensions in the second set of data with sizes of a garment for determining distributions 210 associated with sizes. As described above, the distribution determination module 118 may determine a distribution 210 of ranges for each of the dimensions associated with a plurality of users 106 for the sizes of the garment. The distributions 210 may correspond to the size, brand, or user dimension and may be based at least in part on the second set of data. In at least one example, the distributions may be used to compare ranges of user dimensions in the context of a particular size. In additional or alternative examples, the distributions may be used to compare individual sizes of a plurality of sizes in the context of a particular range of a user dimension. The distribution determination module 118 may determine the values based on determining a number of users 106 within each of the ranges of a user dimension who purchased a garment in the size. The distribution 210 may refrain from including data associated with the users 106 who returned the garment in the size or provided negative feedback about the fit of the garment. In at least one example, the distribution determination module 118 may increment a baseline value by a first value representative of the plurality of users 106 within a range corresponding to the baseline value who acquired the garment in the size and decrement the baseline value by a second value representative of the number of users 106 within the range of the user dimension who at least returned the garment or provided negative user feedback related to the fit of the garment.

Block 608 illustrates comparing the first set of data and the second set of data. The data comparison module 120 may compare user dimensions 204 associated with a user 106 (e.g., user 106 looking to purchase a garment) and the second set of data based at least in part on the plurality of distributions. In at least one example, comparing the first set of data and the second set of data may include comparing individual user dimensions 204 (e.g., height, weight, etc.) with distributions 210 for the same user dimensions 204. The data comparison module 120 may determine, based at least in part on the distribution of ranges of a particular dimension and a size, that a number of the plurality of users within a range that is a same range associated with the dimensions of a user is greater than a number of a plurality of users 106 within the other ranges. Accordingly, the data comparison module 120 may recommend the size to the user 106, as described below. In other examples, the data comparison module 120 may compare the first set of data and the second set of data and, based at least in part on the distribution of ranges of the particular dimension, may determine that a number of the plurality of users 106 within a range that is a same range associated with the dimensions of the user 106 is less than a number of a plurality of users 106 within the other ranges. Accordingly, the data comparison module 120 may recommend a different size of the plurality of sizes.

In alternative examples, comparing the first set of data and the second set of data may include comparing a range of a user dimension (e.g., the user's height) with a distribution 210 for the same range. The data comparison module 120 may determine, based at least in part on the distribution 210 associated with the range of the user dimension, that an individual value corresponding to a size of the plurality of sizes is greater than other individual values of the plurality of values corresponding to other sizes of the plurality of sizes. Accordingly, the data comparison module 120 may recommend the size to the user 106, as described below. In at least one example, the data comparison module 120 may recommend a size to the user 106 based at least in part on learned associations of garments acquired by other users 106 with at least some dimensions that are same dimensions as the dimensions associated with the user 106, as described above.

Block 610 illustrates recommending a size to the user 106. In at least one example, the presentation module 122 may cause a size to auto-populate on a user interface. Additionally, the presentation module 122 may cause one or more distributions 210 to be presented to the user 106 that correspond to the size. In some examples, the presentation module 122 may cause a confidence score to be presented with the size. In some examples, the confidence score may be based at least in part on the number of the plurality of users 106 within the range that is the same range associated with the dimensions of the user 106. In other examples, the confidence score may be based at least in part on the value in a distribution 210 associated with a range of the user dimension of the user 106 that corresponds to a size of the plurality of sizes.

Figure 7:
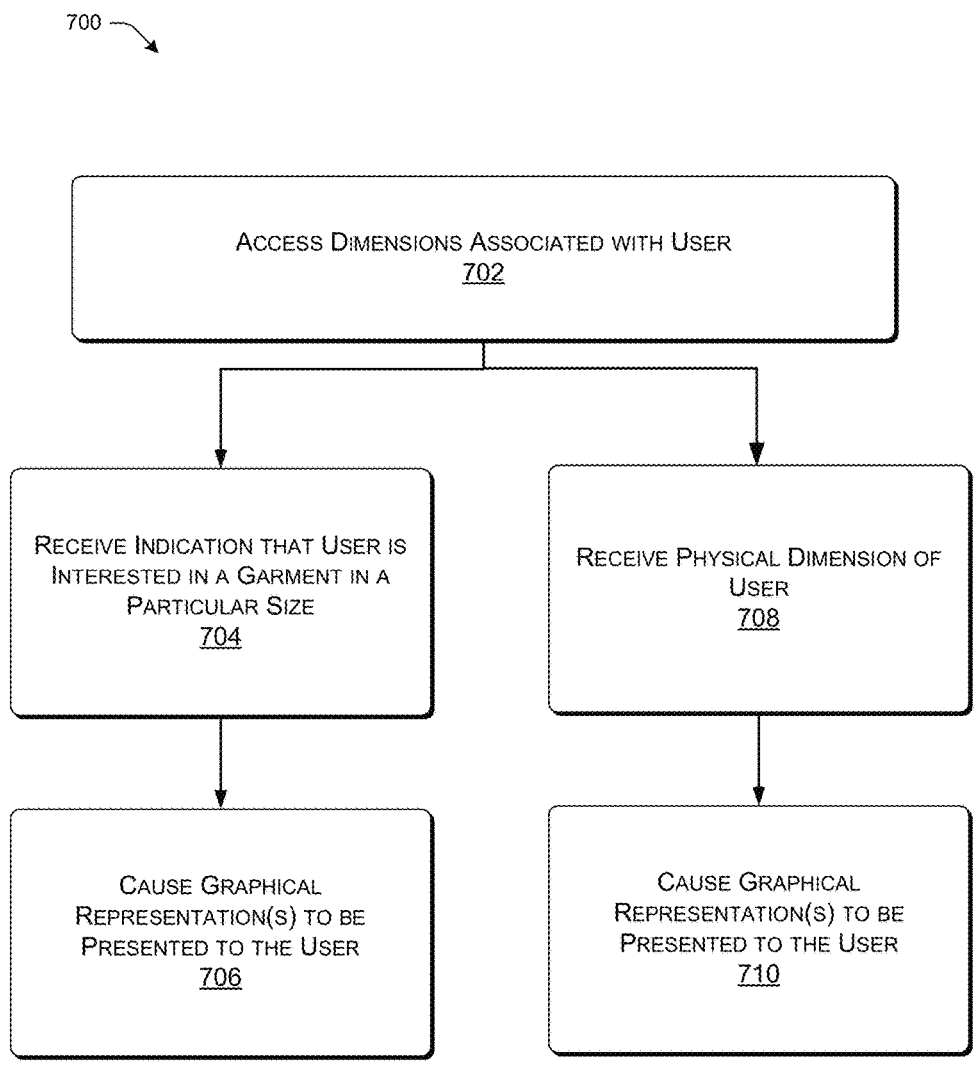
FIG. 7 is a flow diagram showing an illustrative process to generate graphical representations of one or more distributions.

FIG. 7 is a flow diagram 700 showing illustrative process to generate graphical representations of one or more distributions 310.

Block 702 illustrates accessing dimensions associated with a user 106. As described above, the data collection module 116 may collect user dimensions 204. In some examples, the user dimensions 204 may be associated with a user profile 202. In other examples, the data collection module 116 may prompt the user 106 for his or her user dimensions 204, as described above.

Block 704 illustrates receiving an indication that a user 106 is interested in a garment in a particular size. The data comparison module 120 may receive an indication that the user 106 is interested in a garment in a particular size. In at least one example, the user 106 may input a size into a free form text box on a user interface. In other examples, the user 106 may select a size from a plurality of sizes by selecting an item on a dropdown menu, selecting a box corresponding to the size, etc.

Block 706 illustrates causing one or more graphical representations to be presented to the user 106. The presentation module 122 may cause one or more graphical representations to be presented to the user 106. In at least some examples, the presentation module 122 may cause a graphical representation to be presented for each user dimension 204. In other examples, the presentation module 122 may cause graphical representations to be presented as shown in FIGS. 4A and 4C.

Block 708 illustrates receiving a dimension of a user 106. The data comparison module 120 may receive the dimension of the user 106. In at least one example, the user 106 may input a range of a dimension into a free form text box on a user interface. In other examples, the user 106 may select a range of a dimension from a plurality of sizes by selecting an item on a dropdown menu, selecting a box corresponding to the size, etc.

Block 710 illustrates causing one or more graphical representations to be presented to the user 106. The presentation module 122 may cause one or more graphical representations to be presented to the user 106. In at least some examples, the presentation module 122 may cause a graphical representation to be presented for each user dimension 204. In other examples, the presentation module 122 may cause graphical representations to be presented as shown in FIGS. 4B and 4D.

Figure 8:
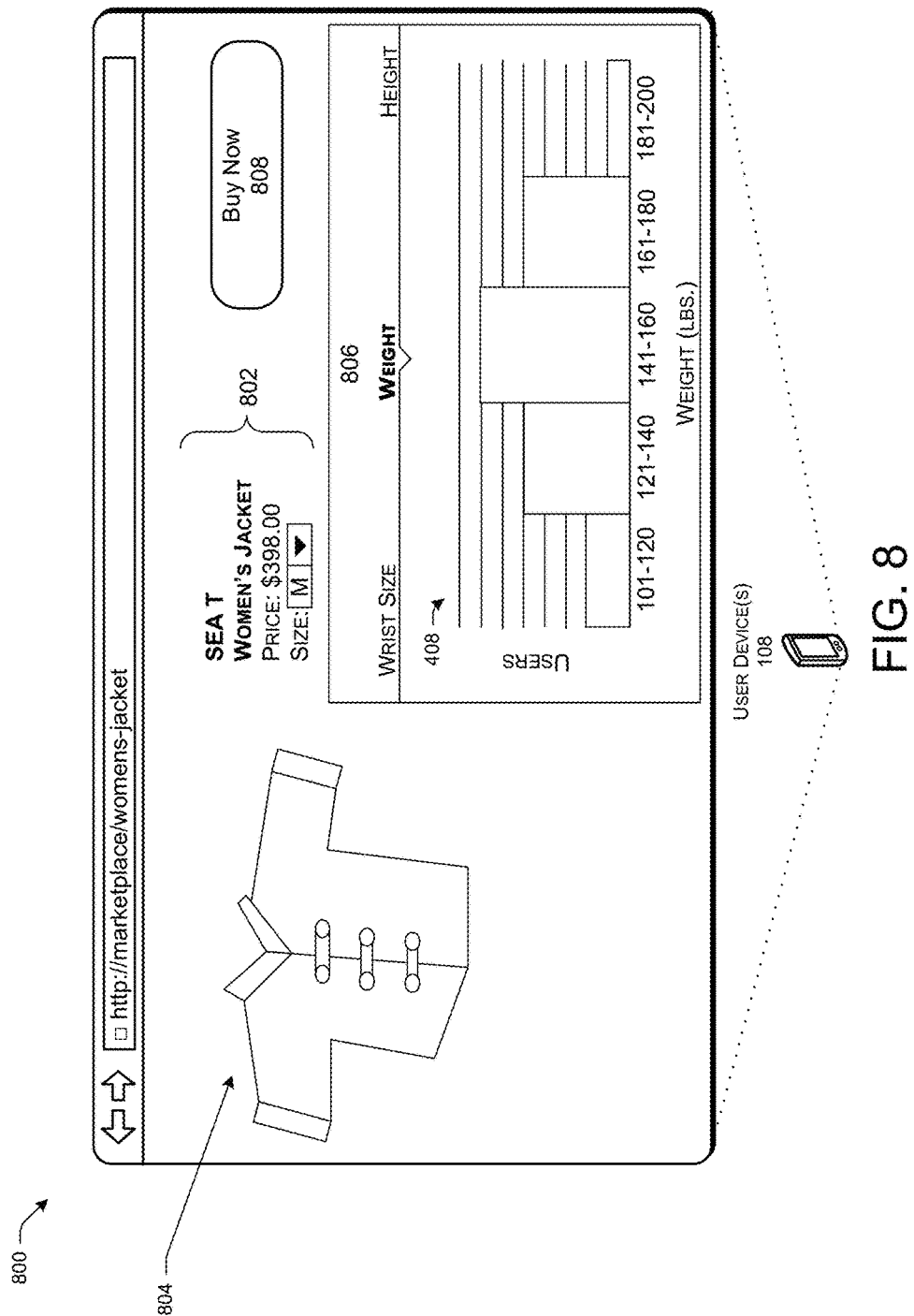
FIG. 8 is a diagram showing an example user interface that may present one or more distributions based at least in part on user dimensions.

FIG. 8 is a diagram showing an example user interface 800 that the presentation module 122 may cause to be presented. The user interface 800 may include a distribution 210 associated with a size of a garment based at least in part on user dimensions. The presentation module 122 may cause a user interface (e.g., user interface 800) to be presented to users 106 utilizing any communication channel, such as an e-mail message, a site (e.g., website) associated with the service provider 102, a text message, a social network site, an application that is associated with the service provider 102 and that resides on user device(s) 108 of the users 106, etc. As a non-limiting example, the user interface 800 may include product information 802 that describes the garment and one or more images, photos, etc., 804 that represent the garment. For instance, the product information 802 may include a brand of the product, a price of the product, a size of the product, descriptive information about the product, etc. In at least some examples, a user 106 may select a size from a drop down menu. In other examples, the data comparison module 122 may recommend a size for the user 106 based on the dimensions of the user 106 and distributions 210 associated with the size and/or brand of the garment. The presentation module 124 may cause one or more graphical representations to be presented to the user 106 in a region of the user interface 800, such as region 806. As described above, the graphical representations may include pie charts, bar charts, or other representations that visually summarize the distributions 210 associated with the size of the brand and/or garment or user dimension. In some examples, graphical representations for all of the user dimensions 204 may be presented. In other examples, graphical representations for some of the user dimensions 204 may be presented and the user 106 may be able to activate a hyperlink associated with the user interface 800 to view additional graphical representations. A user 106 may acquire the product by actuating a control 808 or by providing another indication that he or she would like to acquire the product. Moreover, the user interface 800 is one example of a user interface that facilitates the acquisition of a product and display of one or more graphical representations, and any other presentation or configuration may be used.

The aforementioned techniques include a set of illustrative techniques for creating distributions associated with sizes of apparel based on user dimensions. However other techniques may be employed to accomplish similar results.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory that stores computer-readable instructions that, when executed, cause the one or more processors to cause the system to:
for a garment offered in different sizes, collect data associated with users who acquired the garment, the data including:
a respective size of the garment acquired by individual ones of the users;
a physical dimension associated with the individual ones of the users; and
a number of the individual ones of the users who at least returned the garment or provided negative user feedback related to the fit of the garment;
for individual ones of the different sizes, determine a distribution of ranges of the physical dimension representing a number of the users within each of the ranges of the physical dimension, wherein the distribution refrains from including data associated with the users who at least returned the garment or provided negative user feedback related to the fit of the garment, comprising:
incrementing a baseline value associated with a range of the ranges by a first value representative of the number of users in the range who acquired the garment in the respective size, and
decrementing the baseline value by a second value representative of the number of users in the range who acquired the garment in the respective size and who at least returned the garment or provided negative user feedback related to the fit of the garment;
cause a sizing selector to be displayed in a first region of an interactive user interface, the sizing selector enabling selection of a size among available sizes for the garment;
cause a graphical representation of the distribution for an individual one of the different sizes to be presented in a second region of the user interface; and
at least in part in response to a selection from the sizing selector, cause the graphical representation of the distribution to be updated to correspond to the selection.

2. The system of claim 1, wherein the physical dimension comprises one of height, weight, chest size, waist size, or wrist size.

3. The system of claim 1, wherein receiving the physical dimension is based at least in part on requesting dimensions from individual users of the users in response to:
receiving a request from one of the individual users to acquire the garment; or
receiving user feedback associated with the garment from one of the individual users.

4. The system of claim 1, wherein causing the graphical representation of the distribution to be updated comprises causing a pie chart to be presented to the user, the pie chart comprising a plurality of sectors, wherein an individual sector of the plurality sectors corresponds to a range of the ranges of the physical dimension and has a central angle proportional to the number of the plurality of users within the range.

5. The system of claim 1, wherein causing the graphical representation of the distribution to be updated comprises causing a bar chart to be presented to the user, the bar chart comprising a plurality of bars, wherein an individual bar of the plurality of bars corresponds to a range of the ranges of the physical dimension and has a length proportional to the number of the plurality of users within the range.

6. The system of claim 1, wherein the distribution of ranges of the dimension corresponding to the size is specific to a brand of the garment.

7. The system of claim 1, wherein the one or more processors further cause the system to:
cause a description of the garment to be displayed in a third region of the user interface; and
cause an actuator to be displayed in a fourth region of the user interface to enable selection of the garment for acquisition.

8. The system of claim 1, wherein the graphical representation presented on the display includes less than all user dimensions and the one or more processors further cause the system to:
at least in part in response to a selection of a hyperlink on the user interface, cause graphical representations for additional user dimensions to be presented on the user interface.

9. One or more non-transitory computer-readable media including a plurality of instructions executable by one or more processors of a computing system to:
collect data associated with users who purchased a garment, the data including physical dimensions of the users and sizes of the garment that the users purchased;
for individual ones of ranges of a physical dimension, determine a distribution representing a number of the users within the range of the physical dimension who purchased the garment in each of the sizes, comprising:
incrementing a baseline value associated with the range by a first value representative of the number of users within the range of the physical dimension who purchased the garment in each of the sizes, and
decrementing the baseline value by a second value representative of an additional number of users who at least returned the garment or provided negative user feedback related to the garment;
cause a selector to be displayed in a first region of an interactive user interface, the selector enabling selection among the individual ones of the ranges of the physical dimension;
cause a graphical representation of the distribution for an individual one of the ranges to be presented in a second region of the user interface;
at least in part in response to a selection from the selector, cause the graphical representation of the distribution to be updated to correspond to the selection for use by a user in choosing the garment in one of the sizes.

10. The one or more computer-readable storage media of claim 9, wherein the number of the users within each of the sizes is based at least in part on a number of users with the range of the physical dimension that purchased the size of the garment and did not return the garment or provide negative user feedback related to the fit of the garment.

11. The one or more computer-readable storage media of claim 9, wherein the graphical representation visually summarizes the distribution as a pie chart, bar chart, or pictorial representation.

12. The one or more computer-readable storage media of claim 9, wherein the physical dimension comprises one of height, weight, chest size, waist size, or wrist size.

13. The one or more computer-readable storage media of claim 9, wherein causing the graphical representation of the distribution to be updated for use by the user in making the selection of the garment in one of the sizes comprises generating a pie chart to be presented to the user, the pie chart comprising a plurality of sectors, wherein an individual sector of the plurality of sectors corresponds to a size and has a central angle proportional to the number of users who purchased the garment in the size.

14. The one or more computer-readable storage media of claim 9, wherein the plurality of instructions are further executable by one or more processors of a computer system to:
cause a description of the garment to be displayed in a third region of the user interface; and
cause an actuator to be displayed in a fourth region of the user interface to enable selection of the garment for acquisition.

15. The one or more computer-readable storage media of claim 9, wherein the graphical representation presented on the display includes less than all user dimensions and the plurality of instructions are further executable by one or more processors of a computer system to:
at least in part in response to a selection of a hyperlink on the user interface, cause graphical representations for additional user dimensions to be presented on the user interface.

16. A method comprising:
Collecting, by a processor, data associated with at least some users who purchased a garment, the data including at least physical dimensions of the users and sizes of the garment that the users purchased;
for individual ones of ranges of a physical dimension, determining by a processor a distribution representing a number of the users within the range of the physical dimension who purchased the garment in each of the sizes comprising:
incrementing, by a processor, a baseline value associated with the range by a first value representative of the number of users within the range of the physical dimension who purchased the garment in each of the sizes, and
decrementing, by a processor, the baseline value by a second value representative of an additional number of users who at least returned the garment or provided negative user feedback related to the garment;
causing, by a processor, a selector to be displayed in a first region of an interactive user interface, the selector enabling selection among the individual ones of the ranges of the physical dimension;
causing, by a processor, a graphical representation of the distribution for an individual one of the ranges to be presented in a second region of the user interface;
at least in part in response to a selection from the selector, causing by a processor the graphical representation of the distribution to be updated to correspond to the selection for use by a user in choosing the garment in one of the sizes.

17. The method of claim 16, further comprising determining by a processor the number of the users within each of the sizes based at least in part on the number of users within the range of the physical dimension that purchased the size of the garment and did not return the garment or provide negative user feedback related to the fit of the garment.

18. The method of claim 16, wherein causing the graphical representation of the distribution to be updated comprises generating, by a processor, the graphical representation to visually summarize the distribution as a pie chart, bar chart, or pictorial representation.

19. The method of claim 16, wherein causing the graphical representation of the distribution to be updated for use by the user in making the selection of the garment in one of the sizes comprises generating by a processor a pie chart to be presented to the user, the pie chart comprising a plurality of sectors, wherein an individual sector of the plurality of sectors corresponds to a size, and has a central angle proportional to the number of users who purchased the garment in the size.

20. The method of claim 16, wherein the graphical representation presented on the display includes less than all user dimensions, the method further comprising: at least in part in response to a selection of a hyperlink on the user interface, causing by a processor graphical representations for additional user dimensions to be presented on the user interface.

* * * * *